United States Patent
Rodriguez Ortiz et al.

(10) Patent No.: US 12,050,959 B2
(45) Date of Patent: Jul. 30, 2024

(54) ILLUMINATION SYSTEM OPTIMIZED FOR VERTICAL AND HORIZONTAL SLOT SCANNERS

(71) Applicant: ZEBRA TECHNOLOGIES CORPORATION, Lincolnshire, IL (US)

(72) Inventors: Miguel Orlando Rodriguez Ortiz, Coram, NY (US); Joseph D. Giordano, Bayville, NY (US); Darran Michael Handshaw, Sound Beach, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 7 days.

(21) Appl. No.: 17/710,016

(22) Filed: Mar. 31, 2022

(65) Prior Publication Data
US 2023/0316018 A1   Oct. 5, 2023

(51) Int. Cl.
*G06K 7/10* (2006.01)
(52) U.S. Cl.
CPC ...... *G06K 7/10732* (2013.01); *G06K 7/10811* (2013.01); *G06K 7/10881* (2013.01)
(58) Field of Classification Search
CPC .................................................. G06K 7/10732
USPC ........................................................ 235/454
See application file for complete search history.

(56) References Cited

U.S. PATENT DOCUMENTS

| | | | |
|---|---|---|---|
| 8,857,720 B1 | 10/2014 | Lei et al. | |
| 9,076,054 B2* | 7/2015 | Hennick | H05K 1/189 |
| 2002/0125322 A1 | 9/2002 | McCall et al. | |
| 2015/0253130 A1* | 9/2015 | Schenk | G01B 11/25 356/610 |
| 2020/0320260 A1* | 10/2020 | Drzymala | G06K 7/10831 |
| 2021/0182514 A1* | 6/2021 | Handshaw | G06K 7/10861 |
| 2021/0182517 A1 | 6/2021 | Handshaw et al. | |
| 2021/0240952 A1* | 8/2021 | Rodriguez Ortiz | G06K 7/10742 |

OTHER PUBLICATIONS

International Search Report and Written Opinion for International Application No. PCT/US2023/15715 mailed on Jun. 22, 2023.

* cited by examiner

*Primary Examiner* — Rafferty D Kelly
(74) *Attorney, Agent, or Firm* — Yuri Astvatsaturov (57) ABSTRACT

A slot scanner illumination system for a convertible slot scanner assembly includes a chassis having an optical cavity and a front opening. The optical cavity has an optical axis therethrough, with the optical axis being an axis along which light may be received by the chassis through the front opening. The front opening further has a first edge and a second edge opposite the first edge. A scanning window is configured to at least partially cover the front opening of the chassis, and the scanning window has a normal axis orthogonal to a flat surface of the scanning window. An illumination element is disposed inside of the optical cavity of the chassis. The illumination element is disposed proximal the first edge of the front opening. The illumination element is configured to provide illumination along an illumination axis, wherein the illumination axis is non-parallel with the optical axis and at an angle directed toward the second edge of the front opening.

20 Claims, 9 Drawing Sheets

ILLUMINATION SYSTEM OPTIMIZED FOR VERTICAL AND HORIZONTAL SLOT SCANNERS

BACKGROUND OF THE INVENTION

Barcode and other scanning devices generally capture images within a given field of view (FOV). Barcode readers may be provided to be used in a various orientations depending on environments. For example, some barcode readers may be implemented in a generally vertical orientation to be used in countertops, kiosks, and other vertical scanning environments, and may also be used in a generally horizontal orientation to be used in table or platter environments. Typically, horizontal and vertical barcode readers have different design requirements due to differing fields of view. More specifically, in vertical orientations, the FOV is typically parallel to the tabletop (i.e., perpendicular to the front face of the barcode reader). Conversely, in the horizontal orientation, the FOV is tilted in order to scan barcodes on packages in differing orientations. Further, each of the different FOVs of varied orientations requires different illumination fields for performing scanning of an item or indicia.

These differing design requirements oftentimes require different housing and component locations as well as additional components such as printed circuit boards. The differing illumination requirements of multiple FOVs typically increases system complexity by requiring additional illumination sources, electronics, and optics such as lenses. The increased number of required parts and elements increases the number of fail points for a device, increases the cost of a device, and may require large housing which is not compatible in certain scanning stations or platforms. Additionally, some configurations may be prone to damage from liquids or other foreign matter that may inadvertently enter the device.

Accordingly, there is a need for improved accessories having improved functionalities.

SUMMARY

According to a first aspect, a slot scanner illumination system is provided that includes a chassis having an optical cavity and a front opening. The optical cavity has an optical axis therethrough, with the optical axis being an axis along which light may be received by the chassis through the front opening. The front opening has a first edge and a second edge opposite the first edge. A scanning window is configured to at least partially cover the front opening of the chassis. The scanning window has a normal axis orthogonal to a flat surface of the scanning window. An illumination element is disposed inside of the optical cavity of the chassis. The illumination element is disposed proximal the first edge of the front opening. The illumination element is configured to provide illumination along an illumination axis, wherein the illumination axis is non-parallel with the optical axis and at an angle directed toward the second edge of the front opening.

In some examples, the illumination element is disposed at an angle from 30 and 60 degrees relative to the normal axis of the scanning window. In some forms, the illumination element is configured to provide illumination having an angle of incidence with the scanning window that results in 60%, or greater than 60%, transmission of the radiation. In forms, the illumination element is disposed at a position recessed from the scanning window by between three and six centimeters.

In some examples, the slot scanner illumination system further includes an optical element operatively coupled to the illumination element. In forms, the optical element is disposed (i) to receive illumination from the illumination element, and (ii) to provide the illumination along the illumination axis. In forms, the illumination element includes six light emitting diodes (LEDs) including both red LEDs and white LEDs.

In some examples, the illumination element includes a plurality of illumination elements disposed in two groups, and further includes a scan indicator disposed between the two groups. In forms, the scan indicator is a source of illumination that provides illumination upon successful scanning of an item at the slot scanner illumination system.

In examples, the chassis further includes a flange disposed along the first edge of the chassis. In forms, the flange is configured to at least partially obscure the illumination element from the scanning window.

In further examples, the slot scanner illumination system further includes an imaging sensor disposed in the optical cavity. In forms, the sensor is disposed to receive an image through the scanning window, with the imaging sensor having an imaging field-of-view (FOV) along the optical axis. In forms, the scanner illumination system further includes at least one fold mirror at least partially disposed in the optical cavity. In forms, the at least one fold mirror is configured to redirect the FOV of the imaging sensor through the scanning window. In forms, the imaging sensor is a color imaging sensor.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
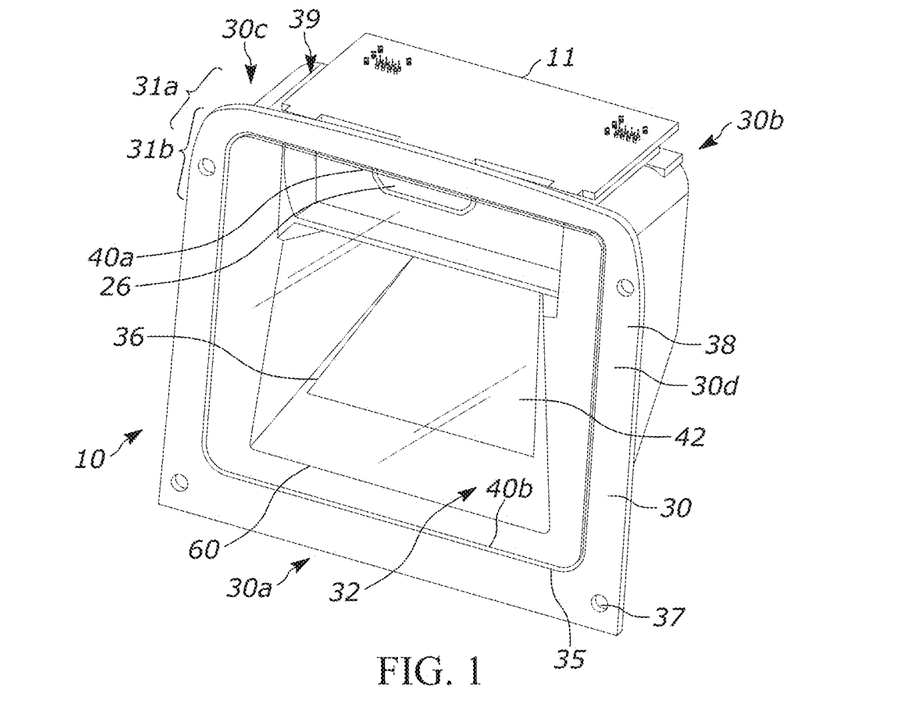
FIG. 1 is a front perspective view of an industrial digital barcode reader assembly in accordance with this disclosure.

Turning to the figures, reference numeral 10 generally identifies a convertible slot scanner assembly for capturing at least one image of an object appearing in a field of view (FOV). The convertible slot scanner assembly 10 includes a circuit board 11, an imaging sensor 12, a controller 16, an image decoder 20, at least one interconnect 22, a chassis body 30, a first window 60, and in some examples, a housing 80. While not depicted in FIGS. 1 and 2, the slot scanner assembly 10 further includes an illumination assembly 24 with illustration beginning in FIG. 3.

The chassis 30 includes a front side 30a, a rear side 30b, an upper side 30c, a front face 30d at the front side 30a, an optical cavity 32, and an opening 34 formed on the front side 30a. In some examples, the chassis 30 may be segmented into quadrants, and may include a front quadrant 31a, an upper quadrant 31b, and so on. It is appreciated that while the remaining quadrants are not provided with reference numerals, each quadrant may be approximately one fourth of the relative dimension (e.g., a thickness or height dimension) of the chassis 30. Further, the optical cavity 32 may include and/or define a mirror support surface 36. The terms "front," "upper," and "rear" are all in reference to a vertical configuration of the scanning assembly 10. A person of ordinary skill in the art would recognize the references and terms in reference to the assembly in a horizontal orientation as descried further herein with respect to illustrative figures.

Generally speaking, the chassis 30 is configured to accommodate all of the opto-mechanics such as the imaging sensor 12, the controller 16, the image decoder 20, the imaging assembly 24, and the interconnect or interconnects 22. Put differently, in the illustrated examples, the imaging sensor 12, the controller 16, the image decoder 20, the illumination assembly, and the interconnect or interconnects 22 are all advantageously disposed on the circuit board 11, which is positioned at or near the upper side 30c and/or the upper quadrant 31b of the chassis. Notably, by positioning these components in the upper region of the chassis, they are less susceptible to damage via liquids or other undesirable objects such as dirt, dust, grime, and the like when the convertible slot scanner assembly 10 is positioned in any of its possible orientations or configurations. Further, by using the chassis 30 to mount the opto-mechanics separately from the housing 80, the assembly 10 may be used in kiosk applications where the assembly 10 does not need the additional housing, thereby reducing costs. Having the illumination assembly 24 disposed on the circuit 11 near the at or near the upper side 30 allows for the illumination assembly to provide even illumination across multiple fields of view (FOVs) of the imaging sensor 12.

In some examples, the chassis 30 may further include a flange 38 that at least partially surrounds the opening 34. In examples where the system includes the housing 80, the flange 38 may act as a mounting mechanism and/or a seal to seal the entire perimeter of the housing 80. The flange 38 may disposed at least along a first edge 40a of the opening 34. The flange 38 disposed along the first edge 40a being configured to at least partially obscure an illumination element from the scanning window. Therefore, the flange 38 may prevent a user from directly seeing illumination elements of the illumination assembly 24 providing more comfortable operation of the scanning assembly 10 for a user of the scanning assembly 10. The flange 38 may also be used as a mounting feature for original equipment manufacturer (OEM) applications such as in a scanning kiosk. The flange 38 may include mounting holes to provide a means for mounting the scanning assembly 10 to a kiosk or point of sale system. The system 10 may further include a seal member such as a gasket (not illustrated) to seal the housing 80 and to create a dust seal and/or an electrostatic discharge seal. The chassis 30 may be constructed from any number of suitable materials such as, for example, metals and/or polymers.

In the illustrated example, the opening 34 further defines a supporting ledge or recess 35. Further, the flange 38 may include any number of mounting features 37 (e.g., holes) to accommodate mounting of the chassis 30 in horizontal, vertical, and/or kiosk applications. However, in other examples (not illustrated), the flange may not be carried by the chassis 30, but rather may be carried by components used to mount the chassis 30 in horizontal, vertical, and/or kiosk applications.

The optical cavity 32 is a generally hollow region that allows light to pass through to the imaging sensor 12, and further allows light to pass from the illumination assembly 24 through the opening 34 to one or more FOVs of the imaging sensor 12. A fold mirror 42 is disposed on the mirror support surface 36 within the optical cavity 32 to redirect the FOV of the imaging sensor 12. The illustrated examples include a single fold mirror 42, which, when combined with the relatively high placement of the imaging sensor 12, advantageously increases a length of the optical path, thereby resulting in a large FOV at the first window 60. Further, such a configuration allows for the FOV to gradually grow, which provides for the retention of resolution as compared to previous designs having rapidly-growing FOVs that in turn lose resolution rapidly outside of the optical cavity 32. In some examples, the fold mirror 42 may include length tolerances to account for any pointing errors of the optical sensor 12. Further, it is appreciated that any number of fold mirrors 42 may be used. In some examples, the fold mirror 42 is positioned to cause a central axis of the FOV to be angled less than approximately 20° relative to a plane perpendicular to the front face 30*d* of the chassis 30. Other examples are possible.

The chassis 30 includes a mounting portion 39 (e.g., a generally flat surface) that accommodates the circuit board 11 by securing the circuit board 11 thereto via any number of suitable approaches. In some examples, only a single circuit board 11 is provided in the convertible slot scanner assembly 10, which may advantageously reduce component costs, reduce the overall number of interconnects, and increase overall reliability. The imaging sensor 12, the controller 16, the image decoder 20, and/or the interconnect 22 may all be directly and/or operably coupled with the circuit board 11 via any number of suitable approaches.

The imaging sensor 12 is configured to capture an image frame appearing in a FOV The imaging sensor 12 can include any number of photosensitive elements. In some examples, the imaging sensor 12 may have a resolution of 2 megapixels, though other examples are possible. The image decoder 20 is communicatively coupled with the imaging sensor 12 and is configured to decode a barcode captured in an image by the imaging sensor 12. In some examples, only the imaging sensor 12 is communicatively coupled to the decoder 20 and is used to process images for decoding indicia.

Figure 2:
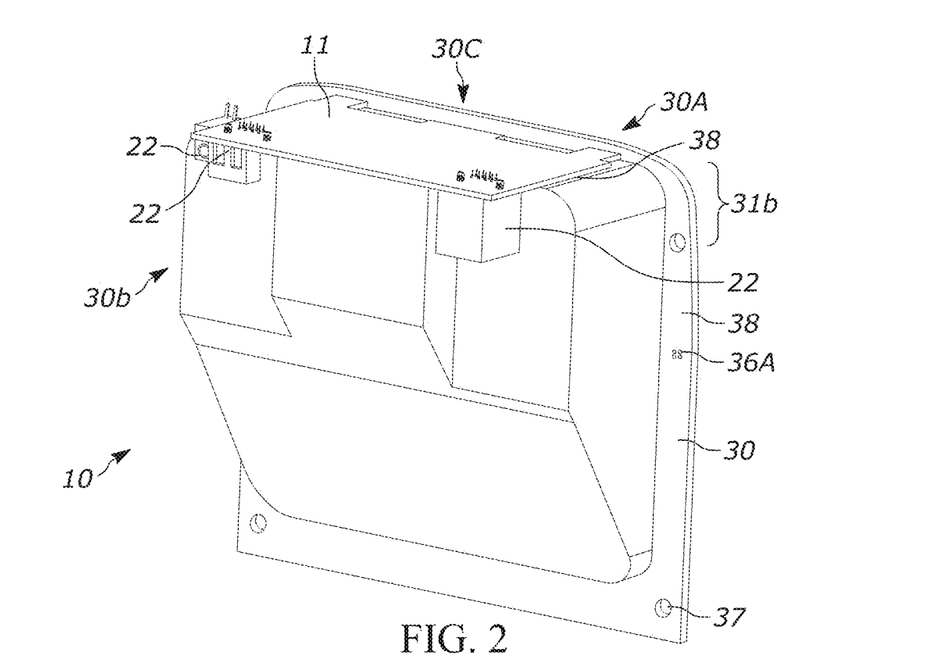
FIG. 2 is a rear perspective view of the industrial digital barcode reader assembly of FIG. 1 in accordance with this disclosure.
Figure 5:
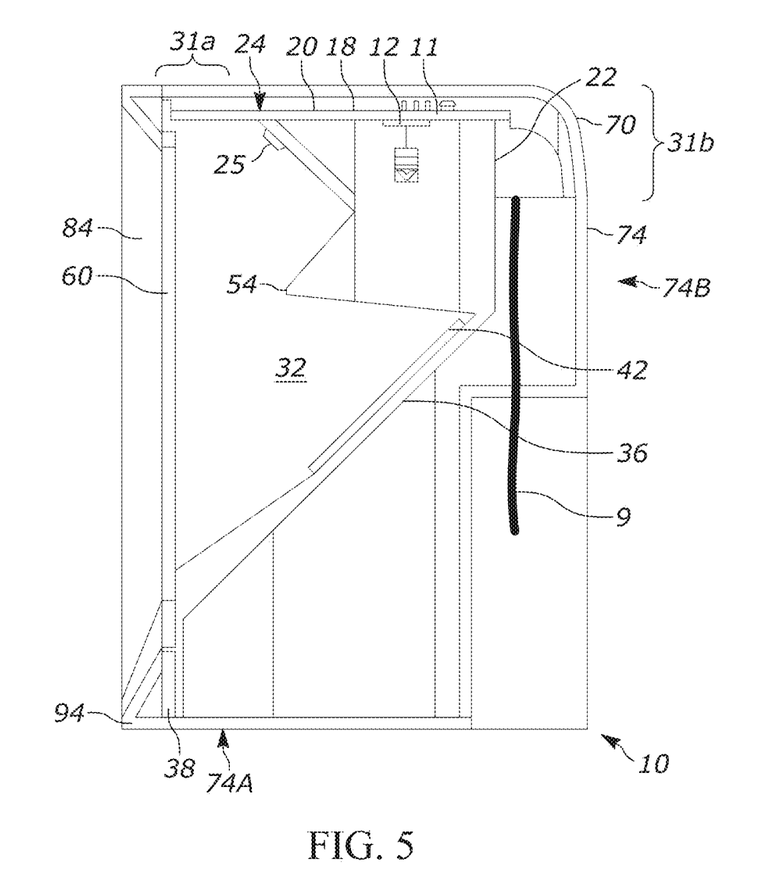
FIG. 5 is a side elevation cross sectional view of the industrial digital barcode reader assembly of FIGS. 1-4 coupled with the second adapter in accordance with this disclosure.

As previously mentioned, in some examples, the interconnect 22 is disposed on the chassis 30. In the illustrated examples, the interconnect is located at the rear side 30*b* of the chassis 30. As illustrated in FIGS. 5-8, the interconnect 22 is downwardly-facing, meaning any cables 9 connected therewith may be routed downwardly. Accordingly, the cable 9 may be disposed within the volume or footprint of the chassis 30. Further, this orientation assists in preventing spills and/or drips of fluid from entering the interconnect 22 in both vertical and horizontal configurations of the chassis 30. As illustrated in FIGS. 2 and 5, any number of different interconnects 22 may be used such as, for example, a main product cable (e.g., an RJ45/RS32 cable), a cable used for a point of sale interface if the assembly 10 is used to host another scanner (e.g., a mini slot handheld scanner), and/or a PCB barrel jack power cable that may be used if an auxiliary scanner is provided. Other examples are possible.

The scanner assembly 10 additionally include an illumination assembly 24 that may be directly and/or operably coupled with the circuit board 11 via any number of suitable approaches. Accordingly, the illumination assembly 24 is also positioned proximal to the first edge 40*a*, at or near the upper side 30*c* of the chassis 30. In some examples (not illustrated), the illumination assembly 24 may be operably coupled with a second, separate circuit board, which may also be positioned at or near an upper region of the chassis 30. While illustrated as being in the optical cavity 32, the illumination assembly 24 may be positioned in a separate illumination cavity of the chassis 30 that is separated (i.e., positioned a distance) and at least partially isolated from the optical cavity 32.

In these examples, the illumination assembly 24 may be in the form of an off-axis illumination assembly. The illumination assembly 24 may include any number of light emitting diodes (LEDs) 25, and other optical elements such as a lightpipe, lenses, mirrors, etc. to evenly distributes the emitted light. In some examples, the LEDs 25 may be in the form of Oslon illumination LEDs that have an approximately 70% intensity over the desired illumination angle (e.g., approximately 60°). Other examples are possible. As with the FOV, light provided by the illumination assembly 24 exits the first window 60 and acts to illuminate the FOV during scanning. In some examples, the illumination assembly 24 may be tilted downwardly relative to the front face 30*d* of the chassis 30 to reduce and/or eliminate glare in the vertical orientation.

The window 60 is generally supported by the chassis 30 and is configured to allow light to pass between a product-scanning region and the cavity 32 of the chassis 30. The first window 60 is generally positioned on the front side 30*a* and within front quadrant 31*a* of the chassis 30. More specifically, in the illustrated example, the window 60 is configured to be positioned on the ledge or recess 35 of the chassis 30. In other examples, the window 60 may simply be configured to at least partially cover the opening 34 of the chassis 30 via any number of suitable approaches. In some examples, the first window 60 is configured to be angled less than approximately 15° relative to a plane formed by the front face 30*d* of the chassis 30. In some examples, the window 60 is configured to be proud of the flange 38 such that the window 60 may be disposed flush with a front bezel of a kiosk (not illustrated) when mounted thereto. In other examples, the window 60 is configured to be generally flush with the flange 38 when disposed within (or covering) the opening 34 of the chassis 30. Accordingly, the assembly 10 may be used in kiosk applications that do not include a recessed window what may accumulate debris.

With reference to FIG. 3-9, the housing 80 may include a housing cavity dimensioned to at least partially accommodate the chassis 30. The housing 80 may be approximately 5.4" tall by approximately 6.0" wide. The housing 80 further includes an exterior surface 74 that, in some examples, may have a generally tapered profile when viewed from the first end 74*a* to the second end 74*b* thereof. As illustrated in FIG. 5, the second end 74*b* of the housing 80 may include openings 76 that are dimensioned and positioned to accommodate the interconnects 22 disposed on the circuit board 11. Further, the second end 74*b* of the housing 80 may include any number of cable guide members or guiding grooves 77 that are sized and dimensioned to receive cables 9 that are inserted and/or coupled with the interconnects 22. In some examples (not illustrated) the guiding grooves 77 may further include clips or securement features to secure the cable 9.

The housing 80 is positionable in a first, horizontal configuration (FIG. 3) where the first window 60 is in a generally horizontal orientation and a second, vertical configuration (FIG. 4) where the first window 60 is in a generally vertical orientation. More specifically, the housing 80 may be operably coupled with one or more adapters 70 and 84, for selectively positioning the slot scanner assembly 10 in horizontal and vertical configurations respectively. In horizontal configurations, the slot scanner assembly 10 may be disposed within a countertop 8 (FIG. 3) where the scanner assembly 10 may be a part of a conveyor or similar checkout environment. In vertical configurations, the slot scanner assembly 10 may be used in kiosks and/or countertop environments.

Figure 3:
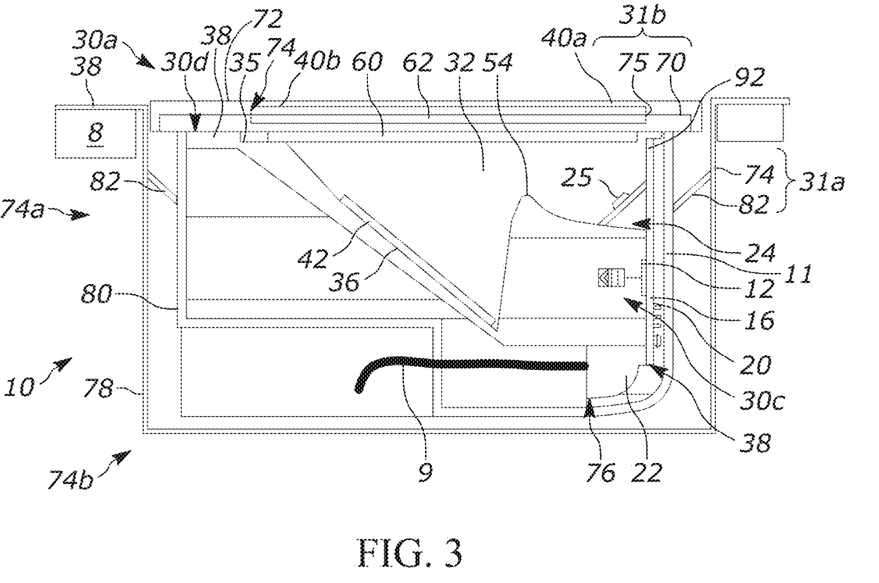
FIG. 3 is a side elevation cross sectional view of the industrial digital barcode reader assembly of FIGS. 1 and 2 coupled with a first adapter in accordance with this disclosure.

Turning to FIG. 3, the adapter 70 is used to position the slot scanner assembly 10 in the horizontal configuration, and includes a platter 72 including a platter opening 74 and a second window 62. In some examples, the first adapter 70 may additionally include a tub 78. As with the chassis 30, the platter opening 74 further defines a supporting ledge or recess 75. The platter 72 may be supported by the housing 80, the flange 38 of the chassis 30, and/or the tub 78. In some examples, the platter 72 may simply rest on top of the housing 80, and in other examples, the platter 72 may be operably coupled therewith. In any of these examples, the platter 72 may be removable from the assembly 10 for cleaning and/or inspection purposes while the housing 80 may be retained in the horizontal position. In some examples, the platter 72 may be keyed so that it senses coupling with the assembly 10.

The second window 62 is generally supported by the platter 72 and is configured to allow light to pass from the product-scanning region, through the second window 62, through the first window 60, and into the cavity 32 of the chassis 30. The second window 62 may be constructed from a harder material than the first window 60 such as, for example, sapphire and/or a glass having a diamond like carbon coating capable of resisting scratching or scuffing damage when items (e.g., products) are slid thereacross during the item scanning process. In some examples, the second window 62 may have a smaller area than the first window 60. More specifically, the first window 60 may have a larger area to support a larger field of view for the vertical and kiosk embodiments, whereas the second window 62 may have a smaller area that clips or reduces the size of the FOV because the harder materials such as sapphire may be more costly, and such a reduced area may lower costs. In some examples, the imaging FOV can be used to detect the presence of the platter 72, and, when coupled with a sensor such as an accelerometer, may prevent the operation of the scanner when the platter 72 is not seen in the FOV. In some examples, a barcode or other symbol (not illustrated) may be placed on an underside of the platter 72 that may be within the FOV of the first window 60. Such a symbol may be used to assist the device 10 in recognizing the presence of the platter 72.

In the illustrated example, the second window 62 is configured to be positioned on the ledge or recess 75 of the platter 72. In other examples, the second window 62 may be configured to at least partially cover the opening 74 of the platter 72 via any number of suitable approaches. In the illustrated examples, the second window 62 is configured to be generally flush with the platter 72 when disposed within (or covering) the opening 74 of the platter 72. Accordingly, items desired to be scanned may slide across these surfaces without being bumped or otherwise jostled. The platter 72 may further include a directional indicator (not illustrated) to provide a user with a visual indication of the scan direction.

In some examples, the tub 78 has a tub cavity dimensioned to at least partially accommodate the housing 80. In the illustrated example, the tub 78 includes a flange 81 that rests on the counter 8. Accordingly, the counter 8 is configured to support the weight of the tub 78 as well as any components disposed therein. The tub 78 may further include any number of centering arms 82 that extend into the tub cavity. The tub 78 may be dimensioned to fit in standard 6"×6" counter openings for horizontal mini slot scanners. The centering arms 82 may be used to center the housing 80 within the tub cavity due to the smaller size of the housing (e.g., approximately 5.4"×6"). Accordingly, the centering arms 82 may be used to retain smaller scan assemblies. In some examples, the centering arms 82 may be constructed from a resilient and/or a flexible material to allow differing housings to be disposed within the tub cavity. Other examples are possible. In other examples, the tub 78 may be configured to engage and couple with the flange 38 of the chassis 30.

Advantageously, by positioning the interconnects 22 at the upper side 30c of the chassis 30, the cable 9 may simply angle downward into the volume or footprint below the scanner assembly 10. As a result, the cable 9 may remain plugged in during installation and removal of the scanner assembly 10, and the scanner assembly 10 needn't be angled or otherwise repositioned during installation.

Figure 4:
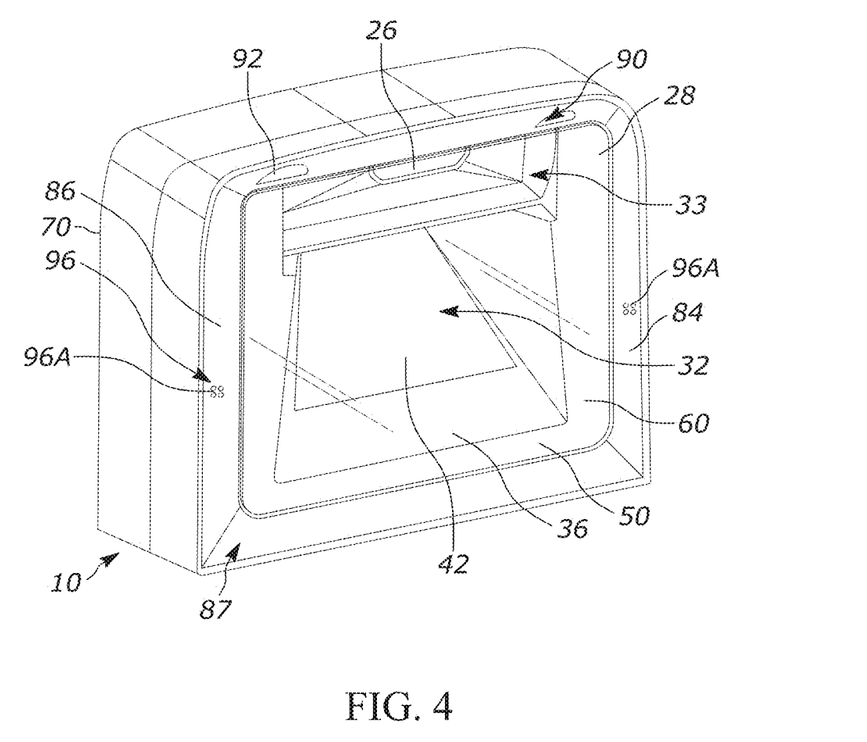
FIG. 4 is a front perspective view of the industrial digital barcode reader assembly of FIGS. 1-3 coupled with a second adapter in accordance with this disclosure.

Turning to FIGS. 4 and 5, the second adapter 84 is used to position the slot scanner assembly 10 in the vertical configuration, and includes an outer bezel 86 or ring member. The outer bezel 86 is configured to engage at least one of the housing 80 or the flange 38 of the chassis 30. In some examples, the outer bezel 86 may include prongs (not illustrated) that are insertable into the mounting features 37 formed on the flange 38 of the chassis 30. As a result, in the illustrated example, the outer bezel 86 may be snapped onto the chassis 30 and may retain the first window 60, and can protrude outwardly from the first window 60 to form a recessed region 87.

Advantageously, by positioning the interconnects 22 at the upper side 30c of the chassis 30, the cable 9 may simply drop downwardly into the volume or footprint below the scanner assembly 10, thereby reducing the overall footprint of the scanner assembly 10.

As previously noted, the scanner assembly 10 may also be used in kiosk environments. By removing the outer bezel 84 and/or the housing 80, the mounting features 37 may be used to secure to a kiosk housing (not illustrated). In these examples, the first window 60 may be generally parallel with the kiosk housing to provide a wide FOV. By removing these components, the assembly 10 is less expensive and will occupy less space within the kiosk. Again, by positioning the interconnects 22 at the upper side 30c of the chassis 30, the cable 9 may simply drop downwardly into the volume or footprint below the scanner assembly 10, thereby reducing the overall footprint of the scanner assembly 10.

So configured, the scanner assembly 10 may be easily convertible to be used in horizontal or vertical environments. The vertical and horizontal oriented environments are further described in U.S. patent application Ser. No. 16/713,252, which is incorporated herein in its entirety.

In examples, the illumination assembly 24 is configured to provide off-axis illumination to one or more FOVs of the image sensor 12 of the scanner assembly 10. FIGS. 6A-6D show the off-axis illumination assembly 24 disclosed herein. The illumination assembly 24 is disposed in the optical cavity 60 proximal to the first edge 40a of the chassis 30. The illumination assembly 24 is disposed such that illumination elements, in the form of LEDs 25, are disposed at a distance away from the window 60. The window 60 may be referred to herein as a scanning window through which an object of indicia may be scanned. The LEDs 25 are positioned at a distance away from the window 60 to allow for illumination of one or more FOVs of the image sensor 12 through the window 60. The LEDs 25 may be positioned at a distance of less than 10 cm, less than 6 cm, or less than 3 cm from the window 60. In examples, the LEDs 25 are disposed between 2 and 6 cm, inclusively, or between 3 and 6 cm from the window 60.

Illumination elements, such as the LEDs 25, of the illumination assembly 24 are disposed at an angle to provide illumination along an illumination axis B of the illumination assembly 24. The illumination axis B is non-parallel with an optical axis A of the scanner assembly 10. The optical axis A is normal to the window 60, and is further an axis along which light propagates that may be directed to the image sensor 12. The illumination axis B is intentionally off-axis from the optical axis A as to reduce light from the illumination assembly 24 from reflecting off of the window 60 and further being detected by the image sensor 12. Further, the illumination assembly 24 is intentionally positioned near the first edge 40a, at a distance away from the window 60, and at an off-axis angle compared to the imaging axis A to provide a substantially even distribution of light to one or more FOVs of the imaging sensor 12. For example, the angle between the optical axis A and the illumination axis B, illustrated as angle $\Theta_{AB}$, may be equal to 40° or 50°. In embodiments, the angle between the optical axis A and the illumination axis B may be less than 30°, less than 40°, less than 50°, less than 60°, less than 70°, from 10° and 20°, from 20° and 40°, from 20° and 50°, or from 30° to 60°. In examples, the illumination assembly 24, and/or the LEDs 25 may be positioned at such an angle to provide the illumination along the illumination axis B. In other examples, optics (e.g., lenses, mirrors, diffractive elements, etc,) may be optically coupled with the LEDs 25 to direct the illumination along the illumination axis B. In examples, the LEDs are disposed to provide radiation having an angle of incidence with the window 60 that results in greater than 50%, or greater than 60% transmission of the light through the window 60. The desired amount of transmission of light may be achieved with the illumination axis B being at an angle of between 30° and 60° relative to the optical axis A. In implementations, the illumination assembly 24 provides illumination that is 3° to 5° broader, or between 4° to 10° broader than a FOV of the image sensor 12 of the assembly 10. The distance between the LEDs 25 and the window 60 may be determined based on the desired angle of incidence of the radiation of the window 60, and desired amount of transmitted radiation. For example, the LEDs 256 may be disposed in the optical cavity 32, at a position recessed from the window 60 that is large enough to allow for an illumination angle of incidence between 30° and 50° with the normal axis of the window.

The LEDs 25 may include both red LEDs 25a and white LEDs 25b. The red LEDs 25a may provide red illumination to a FOV of a monochrome imager, and the white LEDs 25b provide white light to a FOV of a color vision camera. As such, the image sensor 12 may include both a red monochrome barcode scanning sensor, and a color camera or color sensor with each having a respective FOV. The FOVs of the two image sensors may overlap entirely or partially. Therefore, the illumination assembly 24 may provide simultaneous illumination to both FOVs of a monochrome barcode scanning sensor, and a color imaging sensor for scanning in either vertical or horizontal configurations. In examples, all of the LEDs 25 could be white LEDs if the image sensor 12 only includes a color vision camera, or all of the LEDs 25 could be red, or otherwise monochromatic LEDs, if the image sensor 12 only includes a monochromatic barcode scanning sensor.

In implementations of the assembly 10 that include a color vision camera, the chassis 30 may further include a camera opening 14 in the optical cavity 32. A color camera may be disposed behind the camera opening 14 away from the first window 60. Light may propagate through the first window 60, and through the camera opening 14 where the color camera then detects the light.

Figure 6A:
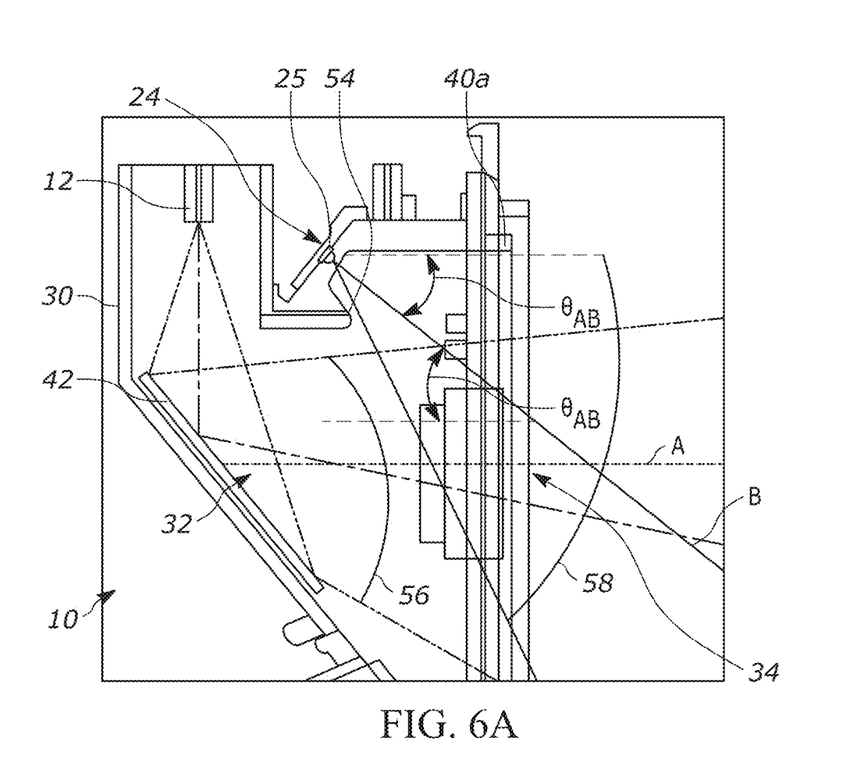
FIG. 6A is a first side perspective cross sectional view of the industrial digital barcode reader assembly and an illumination assembly with imaging and illumination fields of view.
Figure 6B:
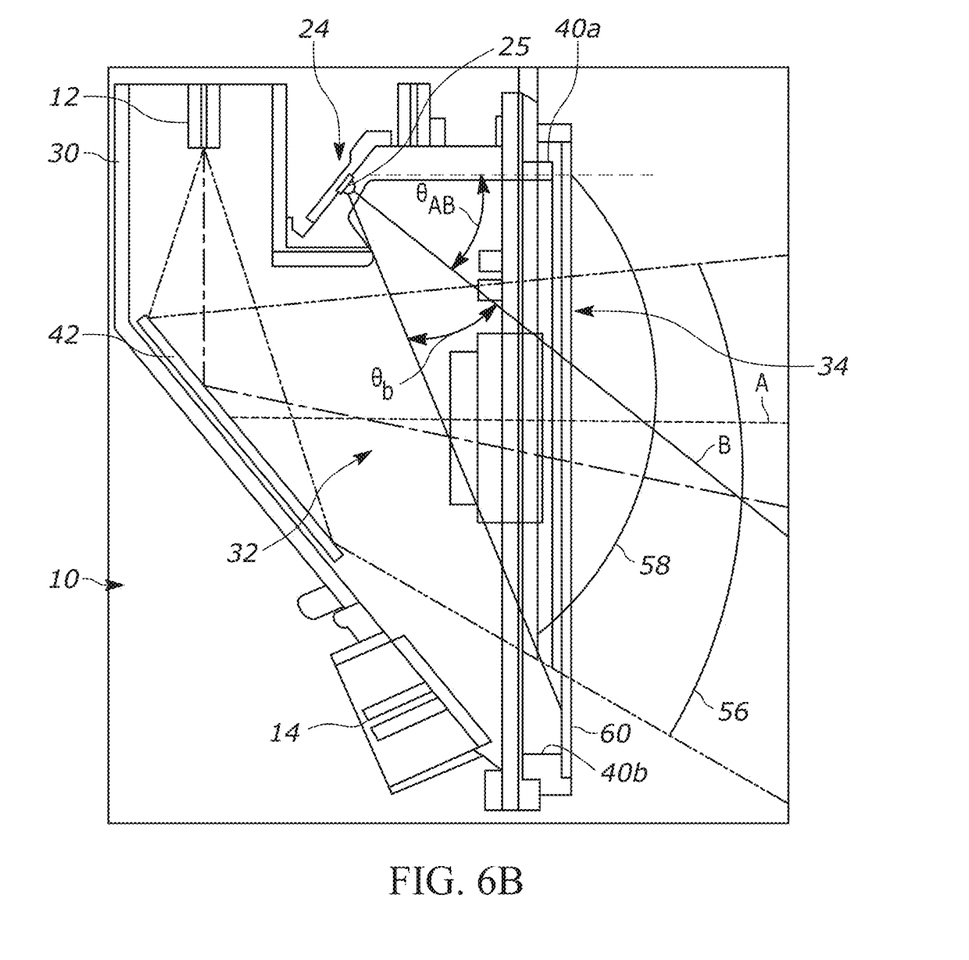
FIG. 6B is a second side perspective cross sectional view of the industrial digital barcode reader assembly and an illumination assembly with imaging and illumination fields of view.
Figure 6C:
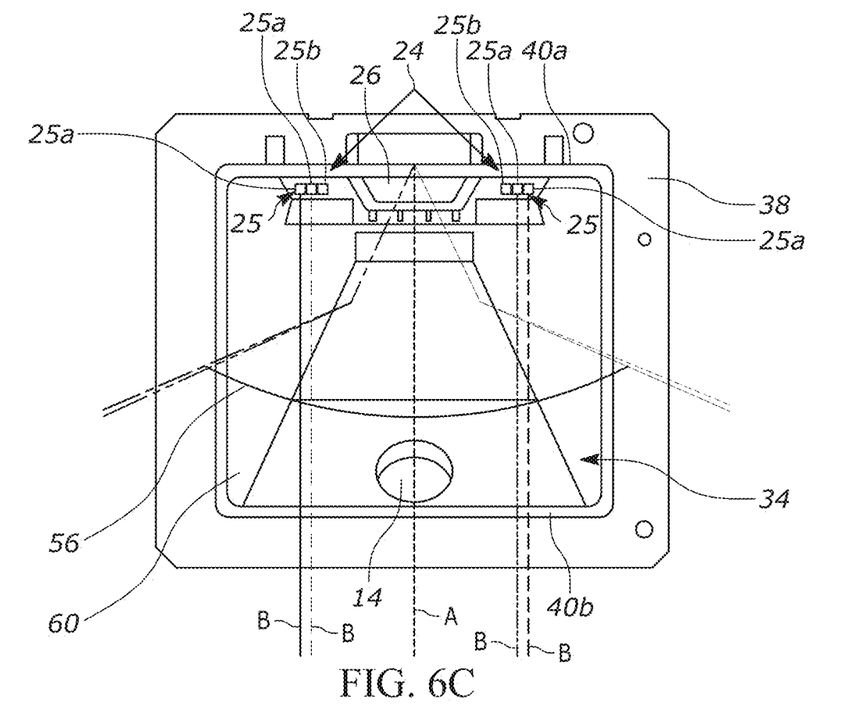
FIG. 6C is a front perspective view of the industrial barcode reader assembly with imaging and illumination fields of view.
Figure 6D:
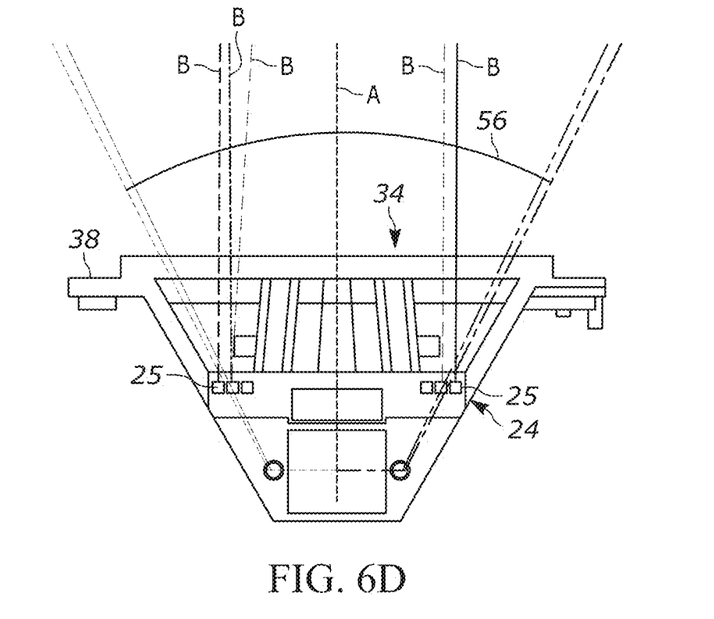
FIG. 6D is a top cross sectional perspective view of the industrial barcode reader assembly with imaging and illumination fields of view.

FIGS. 6C and 6D show an example imaging assembly 24 that employs six LEDs 25 positioned in the optical cavity 32 in two separate groups of three LEDs 25 each. Each of the groups of LEDs 25 provides illumination along a respective illumination axis B. In examples, the illumination assembly may employ less than six LEDs 25 to provide substantially even illumination across one or more FOVs of the imaging sensor 12. Closest LEDs of the two groups of LEDs 25 may be spaced apart by 1 inch, 2 inches, 3 inches, between 1 and 5 inches, by at least 1 inch, by at least 1.5 inches, or by at least 2 inches. The imaging assembly 24 may employ any number of a plurality of LEDs 25 that is dependent on voltage and/or current limitations of a power source that provides power to the assembly 10. The imaging assembly 24 may employ both white and red LEDs 25b and 25a respectively, for performing bother barcode scanning and image scanning using a single assembly 10. For example, red LEDs 25a may be used to provide red light for performing barcode scanning during a scan cycle, and white LEDs 25b may provide white light in a subsequent scan cycle to image an object. In examples, each of the groups of LEDs 25, may employ a single LED 25 each. Therefore, the described illumination assembly 24 may greatly reduce the amount of elements required for providing illumination to multiple FOVs. In examples, each group of the LEDs 25 may only include a single LED in each group.

A scan indicator lightpipe 26 is disposed between the two groups of LEDs 25. The scan indicator lightpipe 26 may be viewable through the first window 60 and the second window 62 when the scanner assembly 10 is used in the horizontal configuration. The illumination cavity 33 may advantageously allow use of a parallel window 60 that is flush or nearly flush with the first end 64a of the exterior surface 64 of the housing 70, thereby allowing the scanner assembly 10 to be used in horizontal and kiosk configurations. A source of illumination, not illustrated, may provide light to the scan indicator lightpipe 26 which may guide the illumination from the source and emit the illumination through the first and second windows 60 and 62. The scan indicator lightpipe 26 may light up and provide a visual signal to a user that a scan has been performed. In examples, the radiation provided to the scan indicator lightpipe may be white light, or another color of light for indicating that a scan has been performed.

In examples, the first edge 40a may protrude at partially into the opening 34 to obscure the LEDs 25 from view of a user. Obscuring the LEDs 25 from view allows for more comfortable operation of the scanner assembly 10. In examples, the first edge 40a blocks illumination from directly impinging a users eye at distances of 1 ft, 2 ft, 3 ft, between 1 and 2 ft, between 2 and 3 ft, or between 1 and 4 ft from the assembly 10. The first edge 40a may protrude a distance that blocks light from impinging the eye of a user in the 5th percentile seated location, which is approximately 14±2 inches above the bottom of the scanning assembly 10, and 20±2 inches away from the first window 60 of the assembly 10.

Figure 7:
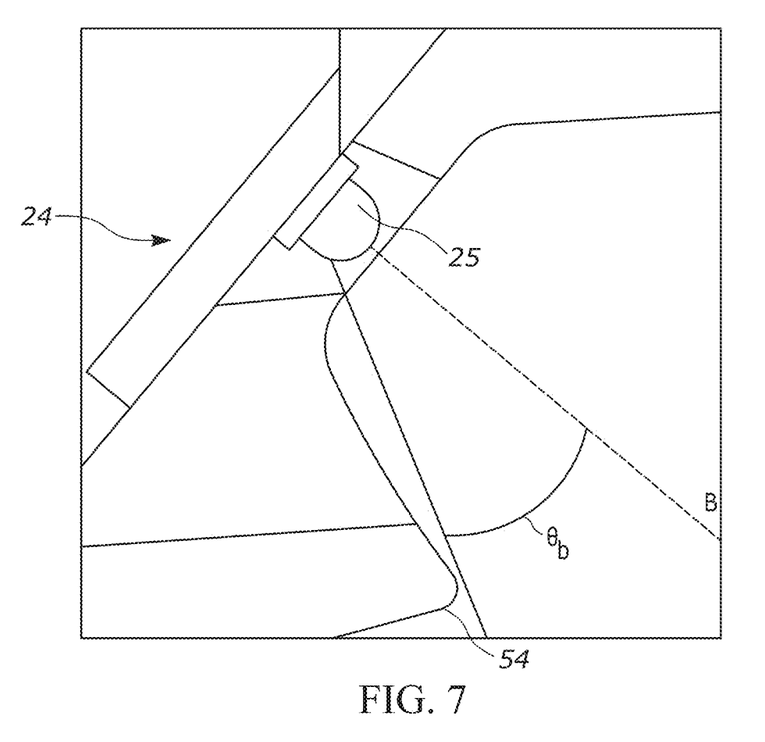
FIG. 7 is a zoomed in view of an illumination element as an LED, and a clipping notch in an optical cavity of the industrial digital barcode reader of FIGS. 1-6D.

FIG. 7 shows a clipping ridge 54 in the optical cavity 32 that is proximal to the LEDs 25. The clipping ridge 54 reduces the illumination FOV of the LEDs 25 by clipping the illumination provided by the LEDs 25. The clipping ridge 54 prevents illumination from the LEDs 25 from reflecting off of internal surfaces of the optical cavity 32 near the second edge 40b. Light that reflects off of internal surfaces of the optical cavity 32 may reach the image sensor 12 causing image noise which may reduce the efficiency of the scanning objects and indicia during operation of the scanning assembly 10. Therefore, the clipping ridge 54 provides one measure of decreasing signal noise while performing scans.

FIGS. 6A-6D illustrate the imaging FOV 56 of the image sensor 12. Further, the illumination FOV 58 is illustrated having overlap with the imaging FOV 56. FIGS. 6A and 6B show a vertical component of the FOVs 56 and 58, while FIGS. 6C and 6D show a horizontal component of each of the FOVs 56 and 58. The illumination FOV 58 provides substantially even illumination across the imaging FOV 56 for multiple distances from the window 60 along the optical axis A. As previously described, the illumination FOV 58 is configured to only provide illumination to the window 60, and to reduce illumination that may reflect off of internal surfaces of the optical cavity 32. As illustrated in FIG. 6B, the illumination FOV 58 may have an asymmetric FOV about the illumination axis. For example, the illumination FOV 58 may have an upper FOV angle of $\Theta_{AB}$ and a lower FOV angle of $\Theta_b$, where $\Theta_{AB}$ and $\Theta_b$ are not equal. For example, the upper FOV angle may be equal to 40°, while the lower FOV angle may equal 28° relative to the illumination axis B. The ridge 54 may clip the illumination to provide the asymmetric illumination FOV 58, or other elements may be used to shape the illumination FOV 58 (e.g., lenses, apertures, mirrors, etc.). Additionally, as shown in FIGS. 6C and 6D, the illumination FOV 58 may have a horizontal dimension that is between 2° to 5° wider, between 4° to 8° wider, or between 5° to 10° wider than the imaging FOV 58.

Figure 8A:
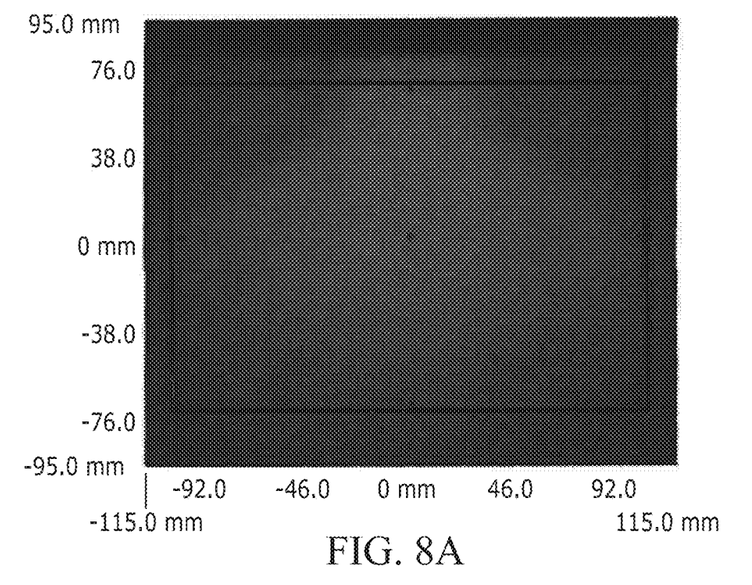
FIG. 8A is a simulated image of illumination provided by an illumination assembly provided by the industrial barcode reader assembly of FIGS. 1-6D, at a distance of four inches.
Figure 8B:
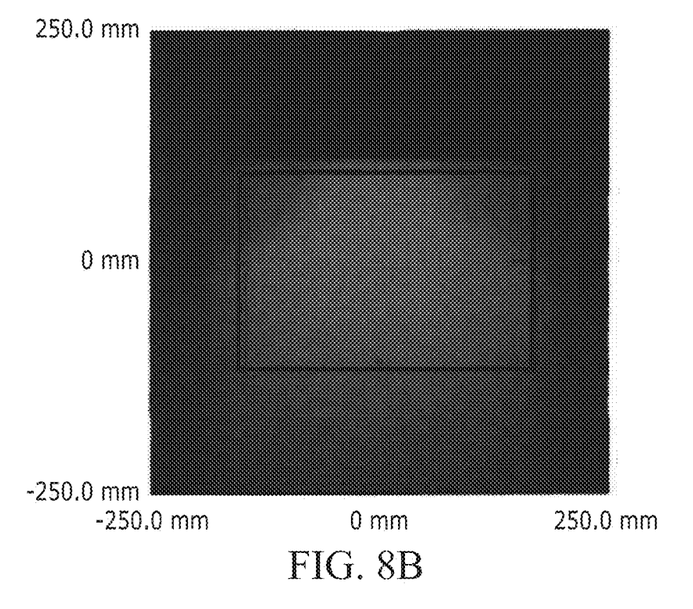
FIG. 8B is a simulated image of illumination provided by an illumination assembly provided by the industrial barcode reader assembly of FIGS. 1-6D, at a distance of eight inches.

FIGS. 8A and 8B are simulated illumination maps showing the substantially even illumination at 4 and 8 inches away from the window 60, respectively. FIG. 8A is an image that shows a simulation of light distribution at four inches from the window 60 in a vertically oriented configuration as described herein, and FIG. 8B is a simulation of light distribution of the same configured imaging assembly at a distance of eight inches from the window 60. Both images show the imaging FOV 56 of the image sensor 12. A ratio of maximum brightness pixel value, to minimum brightness pixel value is used herein to evaluate how uniform the light distribution is across the imaging FOV 56. At both four and eight inches from the window 60, the maximum to minimum brightness ratio was found to be approximately 2. Therefore, the dimmest pixel had a brightness of about 50% of the brightest pixel. In examples, the substantially uniform illumination may have a maximum to minimum brightness ratio of between 1.8 and 2.2, between 1.5 and 2.5, below 2, or below 3. In examples, the illumination uniformity may be determined by taking maximum and minimum brightness values at cross sections of the imaging FOV 56 and normalizing the difference to the maximum brightness value as defined by $$U = \frac{S_{max} - S_{min}}{S_{max}}, \qquad \text{EQ. 1}$$

where $S_{max}$ and $S_{min}$ are values of flux (i.e., W/m²). For example, a maximum flux of 45 W/m² and minimum flux of 20 W/m² results in a uniformity of 0.55. Which also is an example of a uniformity ratio of maximum to minimum of slightly greater than 2. The substantially uniform light distribution is achieved by placing the LEDs 25 at a recessed position away from the window 60, and by having an illumination axis B that is non-parallel and offset from the imaging axis A. Typical illumination systems and devices are incapable of providing any similarly substantially uniform illumination across one, or more, FOVs at a range of distances from an scanning assembly.

While described herein as LEDs 25, the illumination assembly 24 may include one or more other illumination elements. For example, the illumination assembly 24 may include laser diodes, black body radiation sources, fluorescent elements, and/or flash bulbs. Additionally, the illumination assembly 24 may include additional optical elements that are coupled to the LEDs 25, to receive illumination from the LEDs 25. The additional optical elements are physically configured to provide the illumination along the illumination axis B. For example, the LEDs 25 may be lensed LEDs 25, or one or more external lenses may receive light from the LEDs 25, and provide the light along the illumination axis B. Additionally, mirrors may redirect light from the LEDs 25 and provide the illumination along the optical axis B.

The scanner assembly 10 may include any number of additional components to assist in operation thereof. For example, the scanner assembly 10 may include any number of interface elements 90 that a user may interact with. The interface element 90 may be in the form of a button or buttons 92, an illumination member or members of the illumination assembly 24, a sound generating device 96 (e.g., a speaker or a beeper), and the like. Other examples are possible. Generally speaking, the interface elements 90 may be positioned at or near the flange 38 and/or a portion of the housing 80.

The interface elements 90 may be engagable, viewable, or audible from an outwardly facing side of the housing. For example, the button or buttons 92 may be positioned along the flange 38 of the chassis 30 and may be physically engagable through the first adapter 70 and the second adapter 84. The buttons 92 may be in the form of physical buttons or capacitive buttons. In examples using physical buttons, the first and second adapters 70, 84, and more specifically the platter 72 and the outer bezel 86, may include openings 72a, 86a through which the button or buttons 92 may protrude to be engaged by a user. In examples using capacitive buttons, the first and the second adapters 70, 84 may include an indicator (not illustrated) for where the user should press to engage the button 92. In some horizontal implementations, it may be desired to position the buttons 92 under the platter 72 to prevent a user from inadvertently pressing the button 92. Accordingly, the platter 72 may include a hollow cavity to accommodate any such button 92.

As previously noted, an illumination member may include an indicator lightpipe coupled to the illumination assembly 24, which may be viewable through the first window 60 and the second window 62 when the scanner assembly 10 is used in the horizontal configuration. A separate illumination cavity may advantageously allow use of a parallel window 60 that is flush or nearly flush with the first end 64a of the exterior surface 64 of the housing 80, thereby allowing the scanner assembly 10 to be used in horizontal and kiosk configurations.

The sound generating device 96 may be positioned near and operably coupled with the circuit board 11 and may be disposed on the flange 38 of the chassis 30. The flange 38 may include any number of speaker ports 96A to allow sound to travel through the flange 38. Similarly, the platter 72 and the outer bezel 86 may include openings 72b, 86b that allow the sound emitted from the sound generating device 96 to pass therethrough.

So configured, the scanner assembly 10 may be lower cost due to the use of shared parts and can easily be functionally adaptable as needed. By using a single scanner and single illumination assembly for multiple orientations, a total number of product configurations may be reduced including additional circuitry and optics for the illumination assembly. The scanner assembly can be easily implemented in kiosks and self-checkout counters, and can easily be reused in stores even if they wish to change the type of scanner they are using. Further, by using a shared window for both configurations, the scanner assembly is more easily convertible and will maintain the seal for the optical cavity, even if the configuration is switched. The shared window is the only window for vertical orientations, and is retained by the front bezel (which may be snapped on). The shared window becomes the inner window when using the scanner assembly in the horizontal configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A slot scanner illumination system comprising:
   a chassis having an optical cavity and a front opening, the optical cavity having an optical axis therethrough, the optical axis being an axis along which light may be received by the chassis through the front opening, and the front opening having a first edge and a second edge opposite the first edge;
   a scanning window configured to at least partially cover the front opening of the chassis, the scanning window having a normal axis orthogonal to a flat surface of the scanning window;
   an illumination element disposed inside of the optical cavity of the chassis at a position recessed from the scanning window by between three and six centimeters, the illumination element disposed proximal the first edge of the front opening, the illumination element configured to provide illumination along an illumination axis, wherein the illumination axis is non-parallel with the optical axis and at an angle directed toward the second edge of the front opening, and wherein the illumination element provides illumination with an illumination angle of incidence of between 30° and 50° with the normal axis of the scanning window,
   wherein the illumination element comprises a plurality of illumination elements disposed in two groups; and a scan indicator disposed between the two groups, the scan indicator being a source of illumination that provides illumination upon successful scanning of an item at the slot scanner illumination system.

2. The system of claim 1, wherein the illumination element is disposed at an angle of between 30 and 60 degrees relative to the normal axis of the scanning window.

3. The system of claim 1, wherein the illumination axis has an angle of between 30 and 60 degrees relative to the normal axis of the scanning window.

4. The system of claim 1, wherein the illumination element is configured to provide illumination having an angle of incidence with the scanning window that results in greater than 60% transmission of the radiation.

5. The system of claim 1, wherein the illumination element provides illumination to both (i) a field of view of a barcode imager, and (ii) a field of view of a color camera.

6. The system of claim 1, further comprising an optical element operatively coupled to the illumination element, the optical element disposed (i) to receive illumination from the illumination element, and (ii) to provide the illumination along the illumination axis.

7. The system of claim 1, wherein the illumination element comprises less than 6 LEDs.

8. The system of claim 1, wherein the illumination element comprises six LEDs including both red LEDs and white LEDs.

9. The system of claim 1, wherein the illumination element comprises a plurality of LEDs.

10. The system of claim 1, wherein the two groups individually comprise one LED each.

11. The system of claim 1, wherein the two groups individually comprise a plurality of LEDs in each group.

12. The system of claim 1, further comprising an imaging sensor disposed in the optical cavity, the sensor disposed to receive an image through the scanning window, the imaging sensor having an imaging field-of-view (FOV) along the optical axis.

13. The system of claim 12, further comprising at least one fold mirror at least partially disposed in the optical cavity, the at least one fold mirror configured to redirect the FOV of the imaging sensor through the scanning window.

14. The system of claim 12, wherein the illumination element is configured to provide illumination to the FOV of the imaging sensor.

15. The system of claim 12, wherein the illumination element is disposed to provide illumination with a uniformity ratio, defined by maximum to minimum lux, of 2 to 1 in the FOV at the scanning window.

16. The system of claim 12, wherein the illumination element is disposed to provide illumination with a uniformity ratio, defined by maximum to minimum lux, of less than 2 in the FOV at between two and eight inches from the scanning window.

17. The system of claim 12, wherein the imaging sensor is a color imaging camera.

18. The system of claim 1, wherein the two groups are spaced apart by at least 1.5 inches.

19. The system of claim 1, wherein the two groups are configured to illuminate independently and may (i) illuminate simultaneously or (ii) illuminate alternatively.

20. The system of claim 1, further comprising a clipping ridge disposed in the optical cavity proximal to the illumination element, wherein the clipping ridge is positioned to block at least a portion of the illumination provided by the illumination element.

* * * * *